Aug. 7, 1962 W. P. MURPHY, JR 3,048,192

SURGICAL VALVE

Filed Aug. 14, 1957

*INVENTOR*
WILLIAM P. MURPHY, JR

BY Roberts, Cushman & Groover

*ATTORNEYS*

United States Patent Office 3,048,192

Patented Aug. 7, 1962

3,048,192

SURGICAL VALVE

William P. Murphy, Jr., Miami, Fla., assignor, by direct and mesne assignments, of one-half to Cordis Corporation, Miami, Fla., and one-half to Don Baxter, Inc., Glendale, Calif., a corporation of Nevada Filed Aug. 14, 1957, Ser. No. 678,163
6 Claims. (Cl. 137—625.42)

While the subject matter of this invention may be used for various purposes it is particularly adapted for use as a surgical valve. Heretofore valves of this kind have been made of metal and are high in cost. They are cleaned and sterilized after use and inasmuch as the openings in them are small they frequently become clogged with dried blood which is very hard to remove. Sometimes they do not get properly cleaned so that when again put in use they are hard to operate and may cause severe pyrogenic reactions in the patients.

Objects of the invention are to provide a valve which is simple in construction and convenient in use, which is light and compact, which does not require a sealing ring for fluid tightness, which may be made by a simple injection molding process and can be sterilized in large batches at the time of manufacture and which is so inexpensive that it is economical to discard it after use, thereby avoiding the difficulty and danger of cleaning and sterilizing for reuse.

According to the present invention the valve comprises a body having a socket in one side, usually the top side, and two or more ducts leading from the socket to the periphery of the body, and a plug rotatably fitted in the socket with a passageway interconnecting a plurality of the ducts in at least one angular position of the plug. One feature of the invention consists in that the passageway is in the form of a groove on the inner end of the plug, instead of a hole extending through the plug, whereby the plug may be easily molded from plastic material. Another feature consists in that the plug is formed of resilient material and has a diameter slightly greater than the socket so as to be compresesd when inserted into the socket, thereby forming a fluid-tight seal without a sealing ring. In a more specific aspect of the invention the socket tapers from its mouth to a circumferential zone adjacent the aforesaid ducts and the diameter of the resilient plug is slightly greater than that of the socket at this zone so as to form a seal with minimum friction. Still another characteristic feature consists in that the body has a flange at its mouth and the plug has an opposed flange engaging under the body flange, the plug being sufficiently resilient so that its flange may be snapped over the body flange.

For the purpose of illustration typical embodiments of the invention are shown in the accompanying drawings in which FIG. 1 is a plan view of one embodiment;

Figure 1:
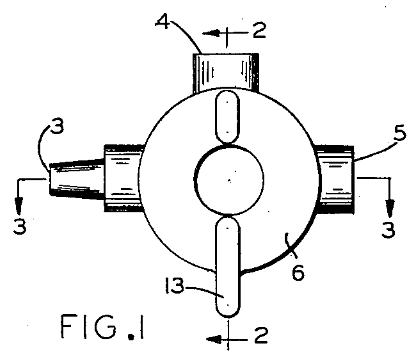
Figure 2:
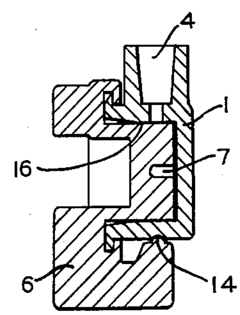
FIG. 2 is a section on line 2—2 of FIG. 1.
Figure 3:
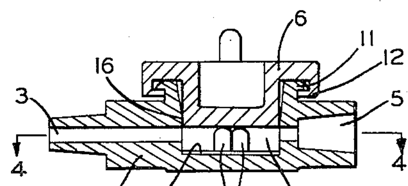
FIG. 3 is a section on line 3—3 of FIG. 1.
Figure 4:
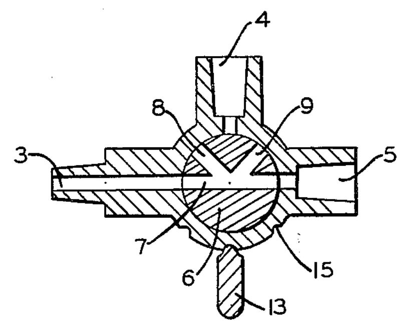
FIG. 4 is a section on line 4—4 of FIG. 3.
Figure 5:
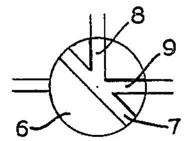
FIG. 5 is a section like FIG. 4 showing the valve in a different position.

The particular embodiment of the invention shown in FIGS. 1 to 4 comprises a body 1 having a socket 2 and ducts 3, 4 and 5 leading from the socket to the periphery of the body 90° apart. Fitting into the socket 2 is a plug 6 having a passageway 7 extending therethrough with two branches 8 and 9 spaced 90° apart and 45° from the passageway 7 as shown in FIG. 4. The body 1 has an outturned flange 11 extending around its mouth and the plug 6 has an inturned flange 12 hooking under the flange 11 to hold the plug on the body while permitting rotation of the plug in the socket. The plug also has a handle 13 which extends alongside the body with a protuberance 14 which snaps into any one of three recesses 15 on the periphery of the body yieldingly to hold the plug in its different operative positions.

As shown in FIG. 3 the socket 2 tapers inwardly from its mouth to a circumferential zone 16 adjacent the aforesaid ducts, the plug being formed of resilient material with a diameter slightly greater than that of the socket at the aforesaid zone so as to be compressed when inserted into the socket, thereby forming a fluid-tight seal without a sealing ring. By making the plug of material having sufficient resiliency, the flange 12 may be snapped over the flange 11. As shown in FIGS. 2 and 3 the passageways 7, 8 and 9 are in the form of grooves on the inner end of the plug, instead of passing through the plug, thereby facilitating the molding of the plug from plastic material. While various materials may be employed I prefer to use a low density polyethylene.

Figure 6:
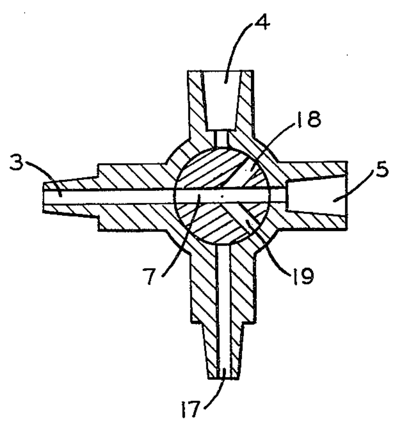
FIG. 6 is a section like FIG. 4 showing a modification.
Figures 7, 8:
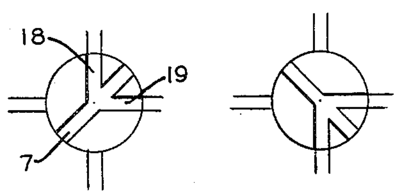
FIGS. 7 and 8 are sections like FIG. 6 showing the valve in different positions.

The modification shown in FIGS. 6, 7 and 8 is like that shown in FIGS. 1 to 5 except that the valve has an additional duct 17 and the branches 18 and 19 of the passageway 7 are disposed on opposite sides of the passageway 7 instead of on the same side.

A typical use of the valve is for blood transfusion. For this purpose the duct 3 is connected to a blood vessel of the patient through a tube and needle, the duct 4 is connected to a bottle of blood and duct 5 is connected to a syringe. With the valve in the position shown in FIG. 5 the valve is cleared of air by drawing blood from the bottle. Then with the valve in the position shown in FIG. 4 the blood is injected into the patient.

The modified valve shown in FIGS. 6, 7 and 8 is particularly adapted for exchange transfusions as for example replacing blood in an infant. For this purpose the valve is first placed in the position shown in FIG. 7 to permit it to be cleared of air by drawing blood from the bottle. Then with the valve in the position shown in FIG. 6 blood is drawn from the patient. The valve is then moved to the position shown in FIG. 8 and the blood is discharged into a suitable receptacle. Then the valve is returned to the position shown in FIG. 7 to draw blood from the bottle, after which the valve is moved to the position shown in FIG. 6 to inject the blood into the patient.

It should be understood that the present disclosure is for the purpose of illustration only and that this invention includes all modifications and equivalents which fall within the scope of the appended claims.

I claim:

1. A valve comprising a body having a socket in one side and ducts leading from the periphery of the socket to the periphery of the body, and a plug rotatably fitted in the socket with a passageway interconnecting a plurality of said ducts in one angular position of the plug, said socket having a tapered portion tapering from its mouth to a generally cylindrical circumferential zone adjacent said ducts and the plug being formed of resilient material with a diameter slightly greater than that of the socket at said zone and a diameter smaller than that of the tapered portion of the socket so as to form a seal with minimum friction and without a sealing ring.

2. A valve comprising a body having a socket in one side and ducts leading from the periphery of the socket to the periphery of the body, and a plug rotatably fitted in the socket with a passageway interconnecting a plurality of said ducts in one angular position of the plug, the socket having a tapered portion tapering from its mouth to a generally cylindrical circumferential zone adjacent said ducts and the plug is formed of resilient material with a diameter slightly greater than that of the socket at said zone and a diameter smaller than the said tapered portion of the socket, so as to form a seal with minimum friction and without a sealing ring, and said body having a flange at its mouth and the plug has an opposed flange engaging under the body flange, the plug flange being resilient so that it may be snapped over the body flange.

3. A valve comprising a body having a socket in one side and ducts leading from the socket to the periphery of the body, a plug rotatably fitted in the socket with a passageway interconnecting a plurality of said ducts in one angular position of the plug, said body having a flange at its mouth and the plug having a flange engaging under the body flange, the plug being formed of resilient material so that its flange may be snapped into engagement with the body flange, and an integral handle of resilient material on said plug, having a first portion extending outwardly of the plug flange, a second portion extending generally at right angles to the first portion and spaced from said body and a third portion extending toward said body generally parallel with the first portion and at right angles to the second portion, said third portion having an inwardly directed protuberance yieldingly bearing on said periphery and the body having a peripheral row of recesses into which the protuberance snaps in the various positions of the valve respectively.

4. A valve comprising a body having a socket in one side and ducts leading from the socket to the periphery of the body, a plug rotatably fitted in the socket with a passageway interconnecting a plurality of said ducts in one angular position of the plug, said body having an outwardly extending flange at its mouth with a top surface which tapers outwardly and downwardly, said plug having a top portion from which depends a peripheral portion with an inwardly directed flange spaced from the top portion, the plug being formed of resilient material so that its flange may be snapped into engagement under the flange on said body, the tapered top surface of the body flange being spaced from inner surfaces of the top and peripheral portions of the plug in the engaged position of the body and plug.

5. A surgical valve comprising a body and contained plug both made of resilient plastic material, said body having a pair of diametrically opposed peripheral side projections adapted for connection with conduits, and a third such peripheral projection angularly midway between said pair of projections, said body having a socket in one side and ducts leading radially of the socket through said projections, said plug being rotatably fitted in the socket and having in its inner end a diametrical passage groove registerable with the ducts leading through said diametrically opposed projections and having also a pair of radial grooves extending 90° apart from said diametrical groove and each at 45° angularity relative to the diametrical groove so that registerability of said radical grooves in two positions with circularly successive pairs of said ducts requires only 90° plug rotation, an extent of the plug opposite said ducts having a diameter slightly greater than the socket wall containing the ducts so as to be compressed when seated into the socket to form a fluid tight seal.

6. A valve according to claim 5 comprising also interengageable detenting means molded integrally with the body and plug and operable to releasably hold the plug in either of said positions, said detenting means comprising a handle disposed at the side of the body circularly between a pair of said projections.

References Cited in the file of this patent

UNITED STATES PATENTS

| | | |
|---|---|---|
| 1,604,592 | Merry | Oct. 26, 1926 |
| 1,999,808 | Goodman | Apr. 30, 1935 |
| 2,042,186 | Peterson | May 26, 1936 |
| 2,261,213 | Bierman | Nov. 4, 1941 |
| 2,271,349 | Saurer | Jan. 27, 1942 |
| 2,599,274 | Murnin | June 3, 1952 |
| 2,711,846 | Birchall et al. | June 28, 1955 |
| 2,758,610 | Hively | Aug. 14, 1956 |
| 2,832,562 | Myers | Apr. 29, 1958 |
| 2,854,027 | Kaiser et al. | Sept. 30, 1958 |
| 2,872,944 | Ludwig | Feb. 10, 1959 |

FOREIGN PATENTS

| | | |
|---|---|---|
| 23,641 | Great Britain | Nov. 5, 1908 |